US006665751B1

(12) United States Patent
Chen et al.

(10) Patent No.: US 6,665,751 B1
(45) Date of Patent: Dec. 16, 2003

(54) STREAMING MEDIA PLAYER VARYING A PLAY SPEED FROM AN ORIGINAL TO A MAXIMUM ALLOWABLE SLOWDOWN PROPORTIONALLY IN ACCORDANCE WITH A BUFFER STATE

(75) Inventors: Jeane Shu-Chun Chen, Chappaqua, NY (US); Ephraim Feig, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/293,644

(22) Filed: Apr. 17, 1999

(51) Int. Cl.[7] ............................. G06F 13/10; G11C 7/10
(52) U.S. Cl. ........................... 710/52; 710/57; 365/191; 365/194
(58) Field of Search ................... 370/229, 230, 370/232–234; 369/47.32, 47.33; 375/240.48; 386/68, 96; 709/231–235; 710/29, 52, 57, 60; 725/94; 700/94; 365/191, 194

(56) References Cited

U.S. PATENT DOCUMENTS

| 5,175,769 A | * | 12/1992 | Hejna et al. ............... 704/211 |
| 5,479,564 A | * | 12/1995 | Vogten et al. .............. 704/267 |
| 5,583,652 A | * | 12/1996 | Ware ........................... 386/75 |
| 5,664,044 A | * | 9/1997 | Ware ........................... 386/75 |
| 5,809,454 A | * | 9/1998 | Okada et al. ............... 704/214 |
| 5,822,537 A | * | 10/1998 | Katseff et al. .............. 709/231 |
| 5,926,332 A | * | 7/1999 | Yahagi et al. ................. 360/13 |
| 6,301,258 B1 | * | 10/2001 | Katseff et al. ............. 370/412 |
| 6,356,545 B1 | * | 3/2002 | Vargo et al. ................ 370/355 |

FOREIGN PATENT DOCUMENTS

JP          2-244976        *    9/1990

* cited by examiner

Primary Examiner—Ilwoo Park
(74) Attorney, Agent, or Firm—David M. Shofi; Anne V. Dougherty

(57) ABSTRACT

A media player for playing streaming media is capable of dynamically changing its play rate according to network conditions, so as to compensate for delayed packets. The player nominally plays at the prescribed data rate. When packets are delayed, instead of stopping to rebuffer, the player plays the stream slower. Audio pitch is unchanged as it is slowed, and video frame rate is slowed as necessary. A threshold is set so that slowing down beyond the threshold is not allowed. Should the buffer contents fall below a predescribed minimum, the player will then stop playing and rebuffer.

15 Claims, 3 Drawing Sheets

STREAMING MEDIA PLAYER VARYING A PLAY SPEED FROM AN ORIGINAL TO A MAXIMUM ALLOWABLE SLOWDOWN PROPORTIONALLY IN ACCORDANCE WITH A BUFFER STATE

FIELD OF THE INVENTION

This invention relates to media players for playing media which is received dynamically in a stream of packets. More particularly, it relates to a system and method for varying the play rate of a streaming media player in order to compensate for delays in receipt of packets.

BACKGROUND OF THE INVENTION

The Internet and various intranets are well known communication networks for the transfer of digital data. While most of the data transmitted on these networks correspond to text or certain computer programs, more and more of it now pertains to multimedia content such as images, audio and video. Typical Web servers follow the HTTP protocol. When a user requests the content of a URL on a server, the entire content associated with that URL is sent to the user's client machine. Such content comprises an html or htm document with auxiliary information attached to it, such as images and perhaps some animation software. The server will continue sending this data until either it has completed sending all the data or it receives a message from the client to stop sending any more data. Some servers, so-called "streaming servers", serve in streaming mode, such that the data is sent at some prescribed average data rate, say K bits every N seconds. A streaming server is serviced by a scheduling algorithm to maintain this average data rate.

Media players for decoding and playing audio and video have been standard features on personal computers for more than a decade. Apple* Computers had their QuickTime* player, while machines running Microsoft's* Windows* operating system had the Microsoft Media Player* (* indicates trademarks of the respective owners) Early streaming media players typically required that data for the entire content to be played first be resident locally on the computer before the player could start playing. This meant that when media data was coming from some other source on the Web, the player would have to wait until the entire contents were downloaded before starting to play. Recently, media players began to support streaming capabilities. Streaming players buffer some data from outside sources on the Web and then start playing, even though much of the data has not yet arrived. If the data rate of the incoming data is not fast enough, the player would pause when the data in its buffer was depleted, rebuffer with more data, and then continue to play. Buffering is also provided to compensate for jitter in the channel.

Streaming media technology has found other new applications. One such application of streaming media technology is the delivery of audio presentations augmented with images or foils. The images are displayed at appropriate time intervals during the audio playback, as prescribed by the authors of the presentation. Various technologies have been invented to accommodate such presentations. Real Networks* is using a file format called SMIL*, which encapsulates all the relevant information in one file, makes certain that all the data that is required during a particular instant of the presentation is already present at the client at such instant, and then streams this file using a streaming server running at some prescribed data rate.

A streaming server delivers data streams isochronally. Typically streaming servers are used to deliver audio and video data, which data is encoded at fixed data rates. When streaming servers deliver video data, for example, the video playback is guaranteed to have smooth motion and sound, provided that the channel bandwidth is high enough. A streaming server sends the video data at controlled bit rates that match the bit rate of the encoded video.

Today's streaming players handle channel congestion by first depleting the buffer, and, once the buffer is depleted, stopping the playback while the buffer refills up to some prescribed level. Once the buffer is sufficiently full, the player resumes playing This, of course, causes an annoying interruption to the playback.

What is desirable, therefore, and is an objective of the present invention is a streaming media player which can maintain playback even when incoming packets are delayed.

Another objective of the invention is to provide a streaming media player which can sense a delay in receipt of packets before its buffer is empty.

Yet another objective of the invention is to provide a streaming media player which can provide for dynamic adjustment of its playback rate in response to sensed delay in receipt of packets.

SUMMARY OF THE INVENTION

The foregoing and other objectives are realized by the present invention wherein the streaming media player receives incoming packets into a buffer and, when the amount of data reaches a first threshold, the media player begins playing back the data. The player is adapted to detect a delay in receipt of incoming packets when its buffer has less than a second threshold of stored information. Upon detection of such a condition, the streaming media player dynamically varies (i.e., slows) its playback rate without changing the pitch, thereby minimally impacting the audio output. The playback rate can be adjusted downward to a preset minimum. The media player will resume its normal playback rate when the buffer contents again reach the second threshold for stored information. Should the buffer contents fall below a third threshold, the player will stop and rebuffer, as had been done in the past.

The present invention provides an alternative for handling channel congestion with either no interruptions or fewer interruptions. The present invention does not wait for the buffer to empty and then stop playing. Rather, when the contents in the buffer are less than a prescribed amount (i.e, the second threshold), the player adjusts its playback speed and slows down sufficiently so that the incoming data rate is at least as large as the outgoing (for playback) data rate, as long as that slowdown is above some preset limit The player dynamically adjusts its playback rate between its ideal rate and one that is allowable yet slow enough to allow the buffer to stay above a third threshold. If the buffer size falls below the third threshold, then the player stops and the buffer again fills. The player continues only once the buffer level has reached some predetermined level (presumably the second threshold).

BRIEF DESCRIPTION OF THE DRAWING

The invention will now be described in greater detail with specific reference to the appended drawings wherein.

DETAILED DESCRIPTION OF THE INVENTION

Figure 1:
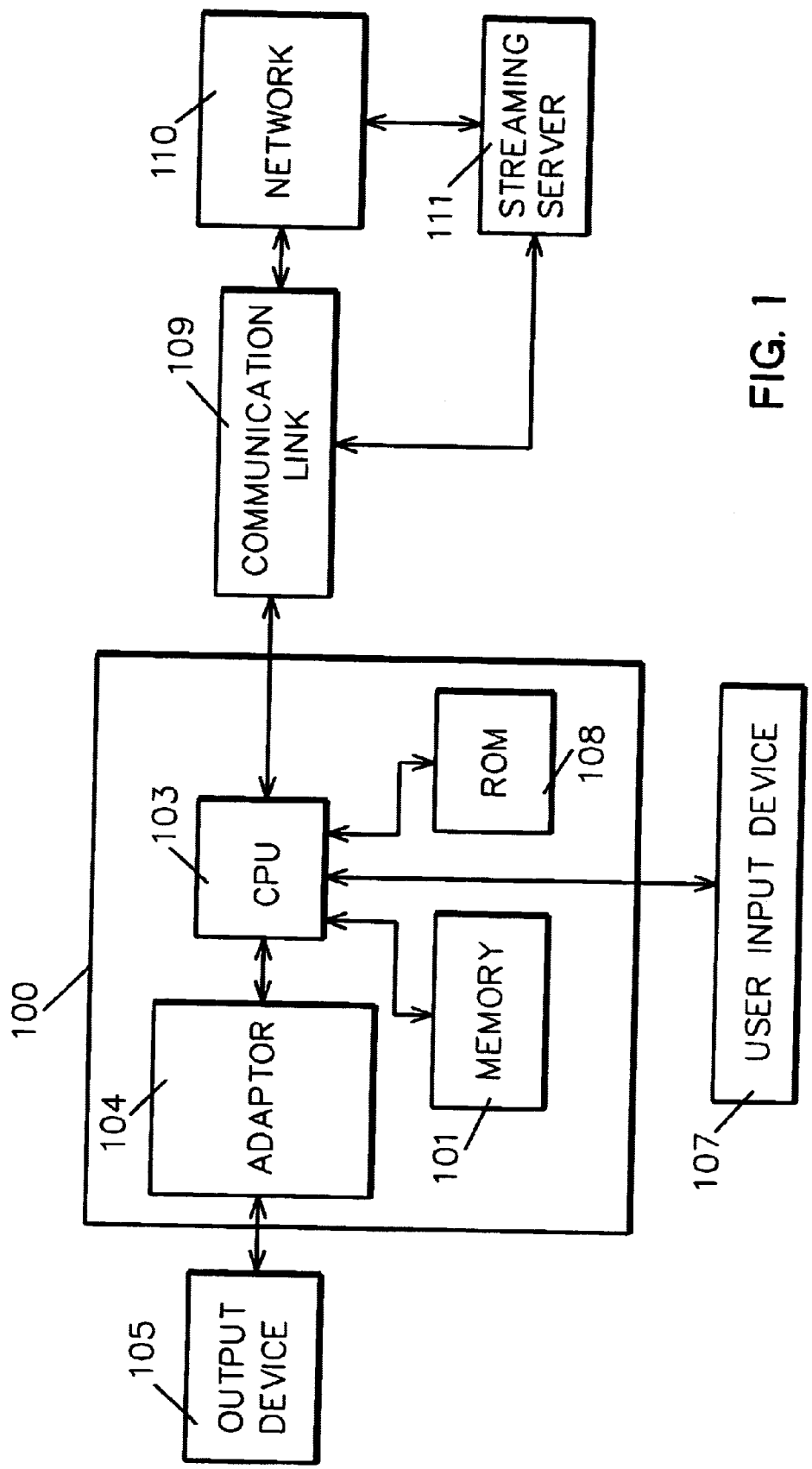
FIG. 1 provides a schematic illustration of a system for implementing the present invention.

The present invention may be implemented on any computer processing system, 100, including, for example, a personal computer or a workstation. As shown in FIG. 1, a computer processing system as may be utilized by the present invention generally comprises memory 101, at least one central processing unit (CPU) 103 (one shown), and at least one user input device 107 (such as a keyboard, mouse, joystick, voice recognition system, or handwriting recognition system). In addition, the computer processing system includes a nonvolatile memory, such as (ROM), and/or other nonvolatile storage devices 108, such as a fixed disk drive, that stores an operating system and one or more application programs that are loaded into the memory 101 and executed by the CPU 103. In the execution of the operating system and application program(s), the CPU may use data stored in the nonvolatile storage device 108 and/or memory 101. In addition, the computer processing system includes an adapter 104 coupled between the CPU 103 and an output device 105. The adapter 104 receives information which is to be output at the output device from the CPU and adapts that information for output. For example, 104 may be a graphics adapter for converting digital information into analog information for display at a CRT or LCD display output device. Similarly, adapter 104 could receive audio signals from the CPU and convert same for output at a speaker output device The application program and/or operating system executed by the CPU 103 generates commands, for example, a graphics command to draw a box (or window), a command to display a bit map image, a command to render a three-dimensional model, or a command to display a video file. Such commands may be handled by the application program/operating system executed by the CPU 103, or by hardware that works in conjunction with the application program/operating system executed by the CPU 103, wherein the appropriate pixel data is generated and the output at the display device 105 is updated accordingly.

In addition, the computer processing system may include a communication link 109 (such as a network adapter, RF link, or modem), located internal to or external to the computer housing the CPU and coupled to the CPU 103, for allowing the CPU 103 to communicate with other computer processing systems on a network 110, for example on a LAN or the Internet. The CPU 103 may receive portions of the operating system, portions of the application program(s), or portions of the data used by the CPU 103 in executing the operating system and application program(s), over the communication link 109.

It should be noted that the application program(s)/operating system executed by the CPU 103 may perform the methods of the present invention described below. Alternatively, portions or all of the methods described below may be embodied in hardware that works in conjunction with the application program operating system executed by the CPU 103. In addition, the methods described below may be embodied in a distributed processing system whereby portions of such methods are distributed among two or more processing systems that are linked together via communication link 109.

The computer system 100 of FIG. 1 is connected, either directly or through the network, to a streaming server, 111, which serves data at some prescribed data rate. Such data can comprise video data or audio data or any other data that is to be played back at a prescribed data rate. The connection is typically via an intranet (e.g., LAN) or the Internet. The streaming server will receive a request from the computer system 100 and generate a stream of packets in response. That stream of packets is provided to computer system 100 for display to the user at output device 105.

Figure 2:
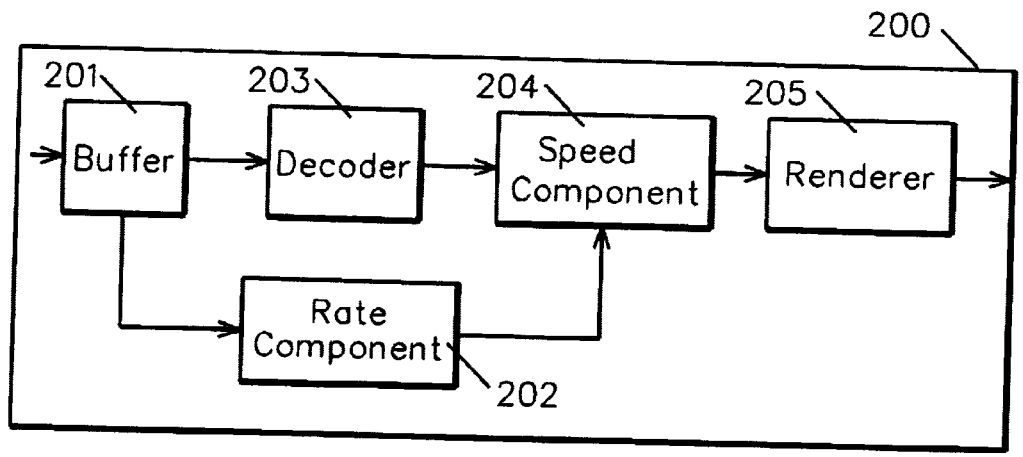
FIG. 2 provides a schematic representation of a variable rate streaming audio player in accordance with the present invention.

FIG. 2 illustrates the components of the present invention as implemented in a variable-speed streaming audio player. To compensate for delays in receipt of the packets from streaming server 111, the computer system 100 will include a streaming media player, 200 of FIG. 2, which senses delays in packet receipt and dynamically adjusts its playback rate to compensate for the delay. There are various techniques for varying the speed of audio playback without changing the pitch, including Wavefrom Similarity Overlap Add, as demonstrated in U.S. Pat. No. 5,479,564, entitled "Method and Apparatus for Manipulating Pitch and/or Duration of a Signal" by Vogten, et al, U.S. Pat. No. 5,175,769, entitled "Method for Time-Scale Modification of Signals" by Hejna, et al. and IBM patents U.S. Pat. Nos. 5,664,044 and 5,583,652, entitled "Synchronized Variable-Speed Playback of Digitally Recorded Audio and Video" by Malcolm S. Ware.

Compressed audio data comes in at a prescribed bit rate, and is buffered at buffer 201 When the buffer has received a certain amount of data, the data is sent to the decoder, 203, to be decompressed Periodically, say every 100 milliseconds, the buffer also sends state information to the Rate component, 202, which determines if it is necessary to invoke the variable speed function, and, if so, what speed to apply. The decoded audio data are read out from the decoder then sent to the Speed component 204, which either simply passes the data along to the Renderer component 205 of the Adapter 104 for output, or slows the data read rate down, by some amount as determined by the Rate function, prior to passing the data to the Renderer. The audio data sent to the Renderer is output as an analog signal which is sent to the output device 105 (e.g., a pair of stereo speakers).

Figure 3:
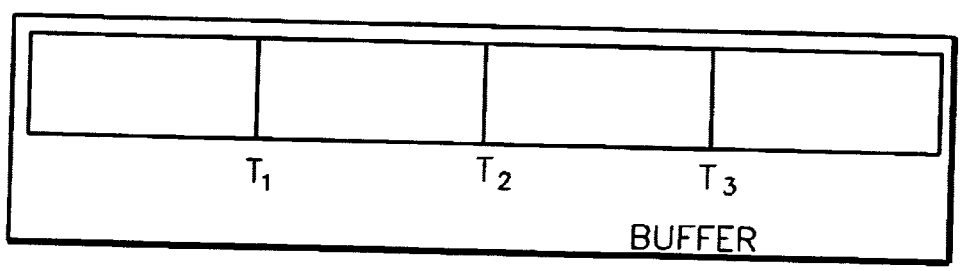
FIG. 3 schematically illustrates a buffer with various thresholds for use in the inventive variable rate streaming media player.

FIG. 3 is a pictorial representation of a buffer for use with the present invention. For the sake of this illustration, it is assumed that the buffer is filled from right to left. The actual size of the buffer and the positions of the various thresholds T1, T2, and T3 are parameters which would be dynamically computed by the Rate component in the CPU based upon the encoded data rate found in the initial packets and the actual arrival data rate as ascertained by the player. When data first comes in, the buffer fills until the T1 point (in the figure, the buffer is empty from the left edge till T1, and full from T1 to the right edge). When the buffer is filled to the first threshold, T1, the player starts playing. Ideally, the buffer state fluctuates around T1 with low variance, assuming a balanced rate of receipt of new data from the streaming server and output of data to the output device. If channel conditions are such that data from the streaming server is delayed or lost, the buffer state moves further to the right. The state of the buffer is reported to the Rate components, 202 of FIG. 2. The state reporting function can be implemented in several ways, including periodic interrogation by the Rate component, periodic automatic state reporting from the buffer, or a combination of the foregoing. When the buffer state is to the right of T2 (i.e., less that a second threshold), the Rate component computes a slowdown value for slowing the rate at which data is output to the output device. The slowdown value is monotonic, such that the rate of slowdown is variable based on the amount of data in the buffer, as manifested by the position of the buffer state relative to the various thresholds, with minimal slowdown when the buffer state is at T1, and maximum allowable slowdown when the buffer state is at T3. The Rate component sends the slowdown value to the Speed component, which executes the actual slowdown according to the slowdown value. Meanwhile, the Decoder, 203, continues decoding the compressed audio, as long as there is data in the buffer to decode.

One particular method for computing the slowdown value is with the formula $$S = M\left(\frac{T2 - B}{T2 - T3}\right)$$

where:
- S is the slowdown value, in percentage of original speed;
- M is a preset maximum allowable slowdown, in percentage of original speed
- B is the buffer,
- T2 and T3 are threshold buffer values as in FIG. 3.

For example, if M is 20 percent, and B=(T2†T3)/2, then S=M/2=10, and the slowdown value is 10 percent of the original speed.

The Speed function can step directly to the speed determined by the newly computed slowdown value, or gradually slow down (or speed up) from its present speed to its newly determined speed (e.g., a gradual change in incremental steps at equally spaced time intervals). The foregoing are design parameters which can be manipulated by the creator of the player: Alternately, the player may have controls for letting users set these parameters.

Figure 4:
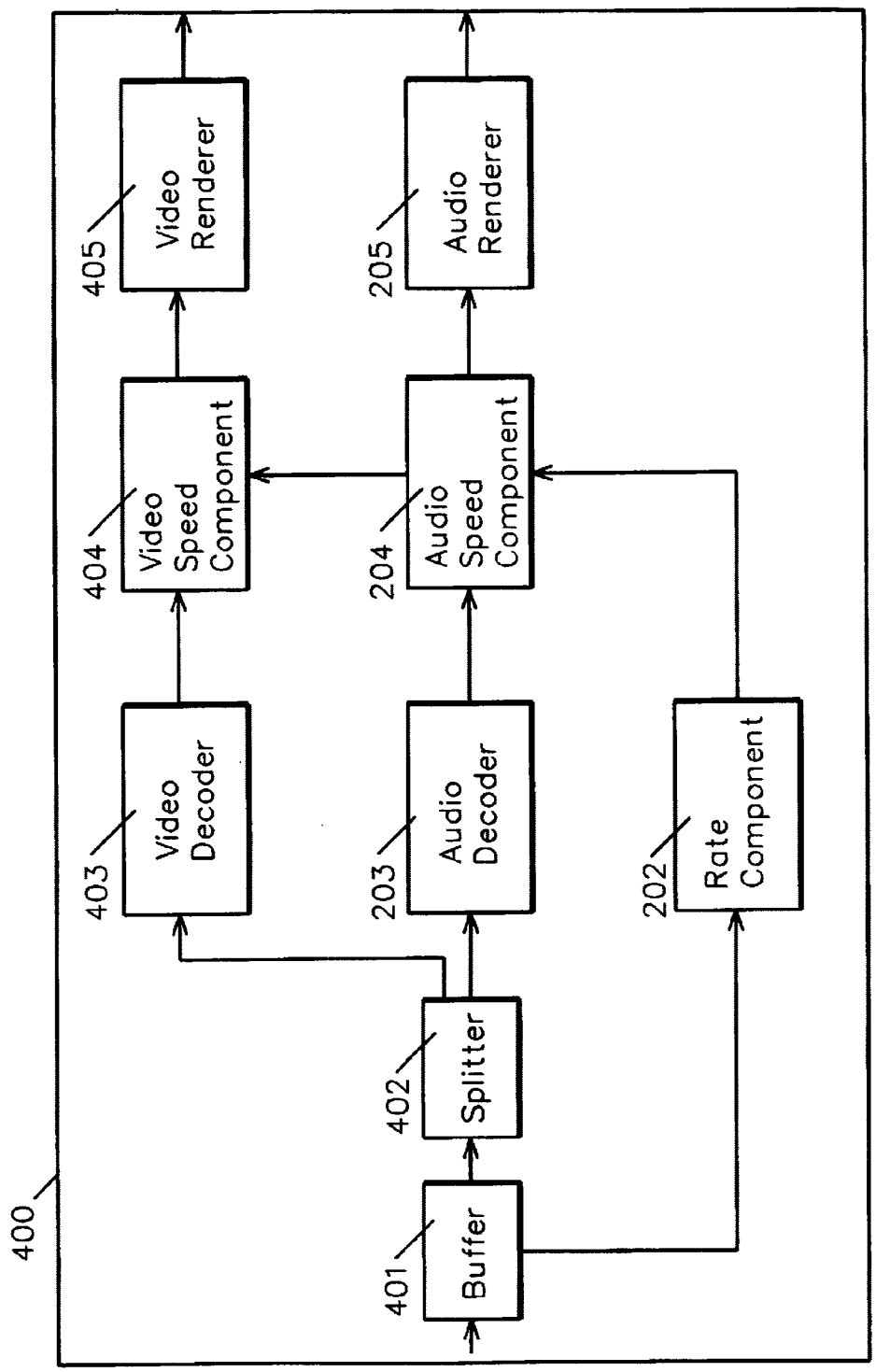
FIG. 4 provides a schematic representation of a variable rate streaming video player in accordance with the present invention.

FIG. 4 illustrates a streaming video player, 400, with the invention applied to streaming video comprising both video frames and accompanying audio. The incoming data has audio and video multiplexed, so that buffer 401 always contains appropriately synchronized data for smooth playback under ideal network conditions (that is, the network can deliver the media data at the prescribed data rate). Splitter 402 splits the multiplexed data into its audio and video components and continuously supplies that data to the audio and video decoders, 203 and 403, respectively. The adjustment of the rate of the audio is handled as above, with the Rate component 202 receiving buffer state input from buffer 401, computing a slowdown rate, and providing the computed slowdown rate to the audio speed component 204. The video playback speed is synchronized to the audio speed. The Video Speed component, 404, receives audio speed input from the audio speed component 204 then plays the video at a frame rate computed to match the audio speed. If the audio speed change is gradual, the video speed change will also be gradual, and in synchronization with the audio speed change. It is to be noted that the invention could be alternatively implemented whereby the rate component provides its slowdown value to the video speed component, with the audio speed then being synchronized to the slowed down video speed.

Though the invention has been described with reference to several preferred embodiments, it is to be understood that one having skill in the art could make modifications to the embodiments as described without departing from the spirit and scope as set forth in the appended claims.

What is claimed is:

1. A streaming media player for receiving media stream input and for producing output of a media stream, comprising:

a buffer for receiving media stream input and for generating at least one buffer state value representing the amount of media stream input in said buffer;

at least one output component for generating output of said media stream; and at least one rate means, coupled to said buffer means and said output means, for receiving at least one buffer state value from said buffer and for varying the rate of output of said media stream from said output means based on said buffer state value;

wherein data first fills some portion-of a buffer before the player starts to play the media content, and wherein the speed change varies according to the formula $$S = M\left(\frac{T1 - B}{T1 - T2}\right)$$

where
  S is the slowdown or speedupvalue, in percentage of original speed;
  M is the maximum allowable slowdown, in percentage of original speed;
  B is the buffer state (the actual amount of data in the buffer when sampled);
  T1 and T2 are values with (size of the buffer) >T1>T2.

2. The streaming media player of claim 1, wherein the media comprises audio.

3. The streaming media player of claim 2, wherein the change in the rate of output of the audio does not alter its pitch.

4. The streaming media player of claim 1, wherein the media comprises synchronized audio and video.

5. The streaming media player of claim 4, wherein the change in the rate of output of the synchronized audio and video does not alter the pitch of the audio.

6. The streaming media player of claim 1, wherein the media comprises audio synchronized with a plurality of images.

7. The streaming media player of claim 6, wherein the change in the rate of output of the audio and the corresponding change in the time at which the images are displayed does not alter the pitch of the audio.

8. A method for a streaming media player having a buffer to produce output of a media stream, comprising:

receiving media stream input into said buffer;

generating at least one buffer state value representing the amount of media stream input in said buffer; and varying the rate of output of said media stream based on said buffer state value;

wherein data first fills some portion of a buffer before the player starts to play the media content, and wherein the speed change varies according to the formula $$S = M\left(\frac{T1 - B}{T1 - T2}\right)$$

where
  S is the slowdown or speedup value, in percentage of original speed;
  M is the maximum allowable slowdown, in percentage of original speed;
  B is the buffer state (the actual amount of data in the buffer when sampled);
  T1 and T2 are values with (size of the buffer) >T1>T2.

9. The method of claim 8 wherein said generating of said at least one buffer state value is done periodically.

10. The method of claim 8 wherein said generating of said at least one buffer state value comprises the steps of:
   comparing the amount of media stream input to at least one threshold value, and
   generating a buffer state value when said amount of media stream input falls below said at least one threshold value.

11. The method of claim 8 wherein said varying the rate of output of said media stream comprises slowing the rate of output.

12. The method of claim 8 further comprising dynamically adjusting the slowdown rate.

13. The method of claim 10 wherein said at least one threshold value comprises a first and a second threshold value and wherein said generating a buffer state value is done when said amount of media stream input falls below a first threshold value.

14. The method of claim 13 further comprising terminating output of said media stream when said at least one buffer state value falls below a second threshold value.

15. A program storage device readable by machine, tangibly embodying a program of instructions executable by the machine to perform the method steps for a streaming media player having a buffer to produce output of a media stream, said method steps comprising:
   receiving media stream input into said buffer;
   generating at least one buffer state value representing the amount of media stream input in said buffer; and
   varying the rate of output of said media stream based on said buffer state value;
   wherein data first fills some portion of a buffer before the player starts to play the media content, and wherein the speed change varies according to the formula $$S = M\left(\frac{T1 - B}{T1 - T2}\right)$$

where
   S is the slowdown or speedup value, in percentage of original speed;
   M is the maximum allowable slowdown, in percentage of original speed;
   B is the buffer state (the actual amount of data in the buffer when sampled);
   T1 and T2 are values with (size of the buffer) >T1>T2.

* * * * *